(12) United States Patent
Mimura (10) Patent No.: US 7,248,169 B2
(45) Date of Patent: Jul. 24, 2007

(54) RECURSIVE-REFLECTIVE DISPLAY DEVICES

(75) Inventor: Ikuo Mimura, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/530,045

(22) PCT Filed: Oct. 8, 2003

(86) PCT No.: PCT/JP03/12873

§ 371 (c)(1), (2), (4) Date: Apr. 1, 2005

(87) PCT Pub. No.: WO2004/034357

PCT Pub. Date: Apr. 22, 2004

(65) Prior Publication Data

US 2006/0044651 A1    Mar. 2, 2006

(30) Foreign Application Priority Data

Oct. 8, 2002   (JP)   ............... 2002-295329
Oct. 11, 2002  (JP)   ............... 2002-298352
Oct. 11, 2002  (JP)   ............... 2002-298869

(51) Int. Cl.
  *G08B 13/14*   (2006.01)
(52) U.S. Cl. ............... 340/572.7; 359/529; 359/528
(58) Field of Classification Search ............ 340/572.7, 340/572.1; 359/529, 530, 531, 532, 533, 359/536, 528
See application file for complete search history.

(56) References Cited

U.S. PATENT DOCUMENTS

| 4,025,159 A | 5/1977 | McGrath ............... 350/105 |
| 4,200,875 A | 4/1980 | Galanos ............... 346/1.1 |

(Continued)

FOREIGN PATENT DOCUMENTS

EP          1 014 301        6/2000

(Continued)

*Primary Examiner*—John Tweel, Jr.
(74) *Attorney, Agent, or Firm*—Fitzpatrick, Cella, Harper & Scinto (57) ABSTRACT

In a retroreflective display device comprising at least a surface-protective layer, information display layer, retroreflective layer and a back-protective layer, on or between these layers radio frequency identification unit or units enclosing radio frequency identification integrated circuit or circuits are disposed, and communication antenna or antennas which are connected to said radio frequency identification integrated circuit or circuits are installed. At the back of the retroreflective layer an illuminator is disposed. The retroreflective layer is retroreflective to the light coming from the front of the sign and is transmissive to the light from the interior of the sign.

36 Claims, 7 Drawing Sheets

U.S. PATENT DOCUMENTS

| | | | |
|---|---|---|---|
| 4,588,258 A | 5/1986 | Hoopman | 350/103 |
| 4,801,193 A | 1/1989 | Martin | 350/103 |
| 4,897,136 A | 1/1990 | Bailey et al. | 156/145 |
| 4,952,023 A | 8/1990 | Brandshaw et al. | 350/102 |
| 5,008,142 A * | 4/1991 | Wilson et al. | 359/536 |
| 5,122,902 A | 6/1992 | Benson | 359/529 |
| 5,264,063 A | 11/1993 | Martin | 156/247 |
| 5,381,137 A * | 1/1995 | Ghaem et al. | 340/572.5 |
| 5,552,679 A * | 9/1996 | Murasko | 359/528 |
| 5,604,485 A * | 2/1997 | Lauro et al. | 340/572.5 |
| 5,608,391 A | 3/1997 | Bantli et al. | 340/933 |
| 5,621,571 A | 4/1997 | Bantli et al. | 359/529 |
| 5,705,852 A | 1/1998 | Orihara et al. | 257/679 |
| 6,004,422 A * | 12/1999 | Janovec et al. | 359/529 |
| 6,083,607 A | 7/2000 | Mimura et al. | 428/167 |
| 6,160,526 A | 12/2000 | Hirai et al. | 343/895 |
| 6,229,444 B1 * | 5/2001 | Endo et al. | 340/572.6 |
| 6,304,169 B1 * | 10/2001 | Blama et al. | 340/572.1 |
| 6,327,072 B1 * | 12/2001 | Comiskey et al. | 359/296 |
| 6,441,551 B1 | 8/2002 | Abe et al. | 313/503 |
| 6,809,892 B2 * | 10/2004 | Toyooka | 359/528 |
| 2002/0024475 A1 | 2/2002 | Okamura et al. | 343/895 |
| 2004/0218273 A1 | 11/2004 | Mimura | 359/530 |

FOREIGN PATENT DOCUMENTS

| | | |
|---|---|---|
| EP | 1 033 778 | 9/2000 |
| EP | 1 039 411 | 9/2000 |
| EP | 1 542 197 | 6/2005 |
| JP | 59-58630 | 4/1984 |
| JP | 118103/1989 | 12/1989 |
| JP | 8-43615 | 2/1996 |
| JP | 2001-33609 | 2/2001 |
| JP | 2001-151313 | 6/2001 |
| WO | WO 96-35196 | 11/1996 |

* cited by examiner

RECURSIVE-REFLECTIVE DISPLAY DEVICES

This application is a national phase of PCT Application No. PCT/JP03/12873 filed Oct. 8, 2003.

TECHNICAL FIELD

This invention relates to retroreflective display devices. More specifically, the invention relates to retroreflective display devices equipped with radio frequency identification units; internally illuminated retroreflective display devices equipped with radio frequency identification units; and electroluminescence internally illuminated retroreflective display devices (hereinafter may be referred to as EL internally illuminated retroreflective display devices).

More specifically, the invention relates to retroreflective display devices which exchange information with radio frequency identification units via communication antennas and enable, particularly at night, recognition from remote places of location of the display devices of the present invention, approach of owners of the devices or viewers thereof, and information given by letters or patterns shown on the display devices, by radiating light in accordance with the principle of retroreflection.

The invention furthermore relates to retroreflective display devices which exchange information with radio frequency identification units via communication antennas and enable, particularly at night, recognition from remote places of location of the display devices of the present invention, approach of owners of the devices or viewers thereof, and information given by letters or patterns indicated on the display devices as illuminated by the illuminators provided at the back of the retroreflective layers, and further by radiating light externally to enable recognition of such visual information from remote places in accordance with the principle of retroreflection, even when the internal illuminators are unable to emit light due to such troubles as power failure.

The invention also relates to EL internally illuminated retroreflective display devices which exchange information with radio frequency identification units via communication antennas and enable, particularly at night, recognition from remote places of location of the display devices of the present invention, approach of the owners of the devices or viewers thereof, and the information given by letters or patterns indicated on the display devices as illuminated by illuminators utilizing EL principle, which are provided at the back of the retroreflective layers, or by radiating light externally to enable recognition of such visual information from remote places in accordance with the principle of retroreflection, even when the EL internal illuminators are unable to emit light due to such troubles as power failure.

The invention moreover relates to retroreflective display devices in which said communication antennas are formed on the reflective surfaces of retroreflective elements.

Those retroreflective display devices according to the present invention are useful for various commercial signboards and signs for various traffic uses such as road signs, construction signs, guide signs, or for vehicle number plates.

BACKGROUND ART

A conventional IC card comprises radio frequency identification unit or units having built-in integrated circuit or circuits, a carrier layer to carry said identification unit or units, said layer comprising a core layer and/or an inner layer, and an upper protective layer and a lower protective layer for protecting the upper face and the lower face of the carrier layer, respectively. This laminate exchanges information between the integrated circuit or circuits and external units through external contact terminals provided on, for example, said upper protective layer, or a communication antenna which is installed on the carrier layer.

Such a conventional contact type IC card provided with external contact terminals performs exchange of electronic signal information with external read-and-write units (reader/writer), or receives power supply, through the external contact terminals provided, for example, on said upper protective layer.

A non-contact type IC card which is installed with a communication antenna (or simply, "antenna") receives power supply and exchanges electronic signal information between its integrated circuit module of, e.g., radio frequency identification integrated circuits, and external reader/writers, through the antenna installed on its carrier layer.

Such non-contact type IC cards are further classified, according to the distance between the involved integrated circuit enclosed laminate and reader/writers, into close coupling type (within 2 mm), proximity coupling type (within 10 cm), vicinity coupling type (within 70 cm) and distance coupling type (more than 70 cm). In general, short waves are used for the close coupling and proximity coupling types which emit radio waves over short ranges; long waves are used for vicinity coupling type and microwaves, for distance coupling type.

Various methods for forming such a non-contact type IC card with an antenna installed therein have been proposed. As methods for forming the antenna, a method of forming an antenna by partially removing a previously installed metallic layer by such means as etching, a method of forming an antenna by partially installing a metallic layer, a method of forming an antenna by using a conductive ink and a method of forming an antenna by winding a metallic thin wire into a coil are known.

Examples of prior art disclosing these antenna-forming methods include JP Patent Publication Hei 11(1999)-134461A to Horio and its U.S. counterpart, U.S. Pat. No. 6,160,526; JP Patent Publication Hei 10(1998)-320519A to Ikefuji, et al. and its EP counterpart, EP 1014301A1; JP Patent Publication Hei 8(1996)-287208A to Orihara, et al. and its US counterpart, U.S. Pat. No. 5,705,852; JP Patent Publication 2002-074301A to Okamura, et al. and its US counterpart, US 2002/24475; JP Patent Publication 2000-251047A to Hayashi, et al. and its EP counterpart, EP 1033778A2; and JP Patent Publication 2000-105810A to Hayashi, et al. and its EP counterpart, EP 1039411A1. Disclosures of those references can be referred to, for further explanation of their techniques.

On the other hand, retroreflective sheetings and retroreflective molded articles which are installed with a multiplicity of retroreflective units (hereafter collectively referred to as "retroreflective sheeting") are used for traffic signs, safety instruments, reflective stickers, commercial signboards and optical-sensor reflectors, particularly for safety and display instruments in the nighttime, which reflect light toward their light sources.

In such retroreflective sheeting, a multiplicity of micro glass bead type or cube corner prism type retroreflective units are installed inside of the sheeting, which are so designed that entrance light into the retroreflective units from a light source is reflected once again toward the light source.

For example, U.S. Pat. No. 4,025,159 to McGrath discloses retroreflective sheeting using micro glass bead type retroreflective units; U.S. Pat. No. 4,588,258 to Hoopman discloses a retroreflective sheeting using cube corner prism type retroreflective units; and U.S. Pat. No. 6,083,607 to Mimura discloses a retroreflective sheeting using cube corner prism type retroreflective units whose retroreflective angularity is improved.

Moreover, as a product equipped with retroreflective sheeting and a storage medium, JP Publication Sho 59(1984)-58630A to Tsukane, et al. discloses a product having a retroreflective layer constituted of glass beads and a magnetic recording layer.

JP Patent Announcement Hei 9(1997)-508983A (U.S. Pat. No. 5,621,571) to Bantli discloses an integrated retroreflective electronic display device. This patent discloses, according to descriptions in its specification, a retroreflective apparatus for visual and electromagnetic data communication, said apparatus comprising retroreflective sheeting for retroreflecting entrance light, said sheeting having visual informations thereon, and comprising a base sheet having a monolayer of retroreflective microspheres which are embedded in one of its surfaces and a regular light reflecting means which is disposed under said microspheres as spaced therefrom by a transparent material; antenna means for electromagnetic communication; and coupling means for allowing coupling to said antenna means.

JP Patent Announcement Hei 11(1999)-505050A (U.S. Pat. No. 5,608,391) to Bantle discloses an electronic license plate having a security identification device. According to disclosures of its specification, said patent discloses an electronic license plate architecture for use in an electronic vehicle communication system in which a plurality of remote traffic management stations communicate with the electronic license plate, comprising a license plate portion, including visual identification information and an identification means for storing restricted information, the restricted information including at least one type of vehicle identification information, and wherein the restricted information cannot be altered by the remote stations or by the vehicle; information means for storing unrestricted information, wherein the unrestricted information can be altered by at least one of the remote stations or by the vehicle; communication means, operatively connected to the identification means and to the information means, for processing communications with the remote stations; antenna means for transmitting and receiving the communications with the remote stations; and attachment means fixed to the vehicle for replaceably attaching the license plate portion on the vehicle, such that the license plate portion can be replaced without having to replace the information means.

JP Patent Publication Hei 4(1992)-229244A (U.S. Pat. No. 5,264,063) to Martin discloses a method for making a retroreflective microprismatic sheeting partially free from a metallic layer, said method comprising partially forming an adhesive layer on a metallic deposit layer formed on surfaces of retroreflective microprisms and removing a portion of said metallic layer which is unprotected by said adhesive layer. It also states that the partially provided adhesive layer (protective coating material) is desirably a pressure-sensitive adhesive which will not be unduly affected during a solvent treating step in later processing. Furthermore, as one of the methods for providing said layer, printing is named.

Furthermore, JP Patent Publication Hei 1(1989)-231004A (U.S. Pat. No. 4,801,193) to Martin discloses a method for making a retroreflective microprism sheet partially free from a metallic layer, which comprises forming a metallic deposit layer on surfaces of retroreflective microprisms, partially forming an adhesive layer on said metallic deposit layer and removing the metallic layer in the areas unprotected by said adhesive layer; and a method for making a retroreflective microprism sheet partially free from a metallic layer, which comprises partially installing a coating material on the retroreflective microprism surfaces, vapor depositing a metal thereon and removing the partially laid coating material.

Methods of removing vapor-deposited layers with laser also have been generally practiced.

U.S. Pat. No. 4,200,875 to Galanos discloses a method of forming an image on an exposed lens type retroreflective sheeting in accordance with a predetermined pattern by a laser method.

Internally illuminated retroreflective display devices are also known.

For example, JP Patent Publication Hei 1 (1989)-298395A (U.S. Pat. No. 4,952,023) to Bradshow discloses "an internally illuminated sign comprising an enclosure transmissive to light on at least one side, designated the front side, and cube corner retroreflective sheeting positioned to reflect light incident on the front of the sign, wherein the cube corner retroreflective sheeting:

(1) comprises a cover layer having a multiplicity of retroreflective cube corner elements and a base layer of transparent material bonded to the cover layer, and (2) has areas, where the base layer has been bonded to the cover layer, which are:

(a) optically transparent to internal light with an angle of incidence greater than or equal to zero degrees and less than 90 degrees, (b) interspersed among the areas occupied by cube corner elements, the proportion of such transparent areas to the total sheeting area and their arrangement relative to each other being fixed to allow viewing the sign by means of either internal illumination, retroreflected light, or both."

JP Patent Publication Hei 2 (1990)-285301A (U.S. Pat. No. 5,122,902) to Benson discloses:

"an internally illuminated sign comprising a cover which is transmissive to light on at least one side, designated the front side, a cover which reflects light incident on the front of the sign and a retroreflective sheet which is positioned to reflect light incident on the front of the sign", which sign uses "a partially transparent retroreflective article formed by three intersecting sets of parallel grooves, comprising a base, prismatic elements having lateral faces intersecting the base at base edges, and separation surfaces on the base, in which:

(a) each set of grooves has a groove side angle that is constant for that set;

(b) the separation surfaces are transparent, are bounded by the base edges of the lateral faces of the prismatic elements, lie between the prismatic elements in at least one of the grooves, and have, taken at any point along any groove in which they lay, curved cross sections taken across that groove."

The present inventor, et al. also have disclosed, in EP 1542197A1, a retroreflective, internally illuminated sign which comprises an information display section having at least one flat or curved surface which retroreflects light coming from the front of said sign and transmits light from the interior of said sign; an illuminator disposed on the back of the information display section; and a housing enclosing and holding these information display section and illuminator, said sign being characterized in that the retroreflective unit used in said information display section is a prismatic retroreflective unit in accordance with the principle of total internal reflection, a large number of said prismatic retroreflective units are disposed in closest contact with each other to form a continuous retroreflective plane, and at least the retroreflective part on the back of said large number of prismatic retroreflective units has no bonded area with other layers and has substantially no hermetically sealed structure.

Whereas, none of the foregoing patents discloses a retroreflective display device which is characterized by comprising at least a radio frequency identification unit with built-in integrated circuit or circuits and an optical retroreflective layer; more specifically a retroreflective display device in which the radio frequency identification unit has as enclosed therein radio frequency identification-type integrated circuit or circuits and communication antenna or antennas installed as connected to said radio frequency identification-type integrated circuit or circuits; still more specifically said communication antenna or antennas are formed on the reflective surface of the retroreflective elements.

The inventor of this invention has disclosed in U.S. Publication No. US2004/0218273A1 a retroreflective article with built-in integrated circuit or circuits which is characterized by comprising at least an integrated circuit module which encloses integrated circuits, an optical retroreflective element and a carrier layer for the foregoing, which is an improvement of the above-described invention.

The same invention also discloses a retroreflective integrated circuit-enclosing article in which said integrated circuit module encloses radio frequency identification-type integrated circuits and a communication antenna connected to said radio frequency identification-type integrated circuits is installed.

Those known IC cards are subject to such problems that the information stored in a contact-type IC card cannot be communicated without inserting the card into a reader/writer; and also with a non-contact-type IC card, it must approach to a distance near enough to allow identification of radio frequency, advance identification at a distance farther than the identifiable distance being impossible.

Furthermore, in case of a tollage settlement system (hereafter referred to as non-stop automatic toll system) by interactive radio communication using a non-contact type IC card on a toll road, there is a problem that it is usually necessary for each vehicle to install an in-vehicle read-and-write unit to assist the communication with the IC card, because of long distance lying between the IC card and an external reader/writer (road side communication antenna).

Until a vehicle approaches said reader/writer (road side communication antenna) near enough to allow the communication with the IC card on the vehicle, therefore, it is difficult for the reader/writer to distinguish vehicles carrying IC cards from those ordinary ones paying toll in cash. In particular, there is a problem at tollgates which concurrently run non-stop automatic toll system and collect tollage in cash, especially in the nighttime, that toll collectors cannot make visual distinguishment in advance. Because of this problem, automatic toll collection gates and cash collection gates have to be separated.

Those retroreflective display devices according to the present invention are used as signs on various commercial signboards and for various traffic uses such as road signs, construction signs, guide signs or vehicle number plates, to render the information displayed on these signs recognizable also in nighttime, and furthermore to enable still higher level information exchange by concurrently reading and writing electronic information stored in the integrated circuits which are enclosed in these signs with said radio frequency identification units.

In particular, when the technology of the present invention is applied to vehicle number plates, manufacture information of the vehicle bodies such as model, color, date of manufacture and information specific for each vehicle such as its owner, registration, tax payment, accident insurance, checkout and the like, can be comprehensively administered.

Therefore, introduction of the technology of the present invention enables to promote, solve or control various problems such as recently increasing theft of vehicles or number plates which now is becoming a social problem, nonpayment of taxes, failure to open accident insurance, negligence to have legal checkout and repair, and the like.

Again, application of the technology to traffic signs enables to supply such information as road regulations, construction information, guide information and the like to vehicle drivers via in-vehicle readers, besides the drivers' visual recognition of those signs.

DISCLOSURE OF THE INVENTION

As a means to solve those problems, this invention enables checkers' advance recognition of presence of IC cards, before intercommunication between a retroreflective display device of the present invention which is equipped with radio frequency identification units and a reader/writer is carried out. As a means to achieve this aim, a large number of retroreflective units are installed in the retroreflective display device equipped with radio frequency identification units in which integrated circuit module or modules are enclosed, so as to enable to reflect light from an external source toward the light source.

More specifically, the invention enables a retroreflective, integrated circuit-enclosing article which is characterized by comprising at least a surface-protective layer, information display layer, retroreflective layer and back-protective layer and a radio frequency identification unit with built-in integrated circuit or circuits, to reflect light from an external source toward said light source, by providing a large number of retroreflective elements on said retroreflective layer.

Visibility of reflection of light by means of retroreflection drops markedly when a viewer is at a position of a large entrance angle. Whereas, in the retroreflective display device of the present invention, an illuminator is provided at the back of the retroreflective layer, and because the retroreflective layer is retroreflective to the light coming from the front surface of the sign and is transmissive of the light coming from the interior of the sign, the device has excellent visibility also for viewers standing at positions of large observation angles.

Said retroreflective element used in the present invention is composed of cube-corner prismatic retroreflective units (occasionally abbreviated as "CC units") or of micro glass bead-type retroreflective units.

As CC units which are retroreflective units used in preferred embodiments of the present invention, at least one type of unit selected from the group consisting of triangular-pyramidal cube-corner units, full cube-type cube-corner units, tent-type cube-corner units and cross-prismatic units can be used. Of these, triangular-pyramidal cube-corner units are preferred, because they easily form a micro size retroreflective element and hence enable to form thin products.

These CC units can be used as specular reflection type CC units which reflect light on their prismatic reflective surfaces, as provided with a metallic thin film layer thereon like micro glass bead-type retroreflective units; or they may be used as total internal reflection type CC units which reflect light on their prismatic reflective surfaces according to the principle of total internal reflection, by providing on their prismatic backs a layer of a low refractive index, such as of air. The latter total internal reflection type CC units do not require deposition of a metallic thin film layer, unlike micro glass bead type retroreflective units, and hence easily transmit the light from the illuminator internally installed and the appearance of the integrated circuit enclosed retroreflective products are not darkened by the color of the metallic thin film layer. Hence, use of such total internal reflection type CC units is advantageous from the standpoint of advance recognizability.

Moreover, in the case of a non-contact type integrated circuit enclosed retroreflective product, total internal reflection type CC units are preferred because they are free from radio frequency noise due to the absence of metallic thin film layer, unlike said micro glass bead retroreflective units or specular reflection type CC units. Similar suppression of radio frequency noise can be accomplished when no metallic thin film layer is laid on micro glass bead retroreflective units, but it invites reduction in the retroreflective area and in consequence, reduction in advance recognizability.

Where a metallic thin film layer is provided on said cube-corner prismatic retroreflective units, an internally illuminated retroreflective display device using a retroreflective layer composed of specular reflection type cube-corner prisms comprising cube-corner prisms and a partially provided metallic thin film layer thereon at an areal ratio of less than 80% is preferred, as it allows easy transmission of light from the internally installed illuminator and is less apt to cause radio frequency noise.

Such metallic thin film layer partially provided at an areal ratio of less than 80% can be formed by a means like etching, to remove the metallic thin film layer, for example, in mesh pattern, to expose the prisms.

Where the areal ratio exceeds 80%, the appearance of the retroreflective layer is darkened and percent transmission of the light from internal illuminator drops. Hence such is undesirable.

Said retroreflective element constituting the retroreflective layer may also be composed of micro glass bead-type retroreflective units.

As said micro glass bead-type retroreflective units, enclosed lens-type can be used, which are made by optionally adhering a thin resin film layer on micro glass beads preferably having a diameter ranging 30-500 μm and a refractive index ranging 1.4-2.5, for adjusting their focal distance where necessary, and thereafter covering 40-70% of the surface area of the micro glass beads with a metallic thin film layer of, for example, aluminum or silver, by such means as vapor deposition or chemical plating, to increase their retroreflectivity.

A preferred example of retroreflective sheeting using such enclosed lens type retroreflective units is retroreflective sheeting whose retroreflective portion is formed of micro glass bead retroreflective units of 30-500 μm in diameter. The surface of such sheeting is covered with a smooth and transparent surface protective layer. Where the retroreflective units have diameters less than 30 μm, diffusion of light due to diffraction becomes excessive to undesirably reduce retroreflectivity. Whereas, retroreflective units having diameters exceeding 500 μm render the sheeting thickness too large and are undesirable.

As other micro glass bead-type retroreflective element, encapsulated lens-type retroreflective units can be used. As such, a retroreflective sheeting in which the retroreflective units constituting the retroreflective portion are micro glass bead-type retroreflective units of 30-500 μm in diameter is preferred. The plastic film constituting said surface protective layer has a smooth and transparent surface. Similar to enclosed lens-type retroreflective sheeting, where the reflective units have a diameter less than 30 μm, diffusion of light due to diffraction becomes excessive to undesirably reduce retroreflectivity, while the reflective units having a diameter exceeding 500 μm render the thickness of the sheeting too large and undesirably degrade sharpness of formed images.

Again, said micro glass bead-type retroreflective element preferably is composed of micro glass bead-type units and a metallic thin film layer partially laid thereon at an areal ratio of less than 80%, as such allows easier transmission of the light from the internally installed illuminator and is less apt to cause radio frequency noise.

Where said areal ratio exceeds 80%, appearance of the retroreflective layer is darkened and the percent transmission of the light from the internal illuminator drops, which is undesirable.

It is preferred to use as such retroreflective layer which constitutes the device of the present invention, a retroreflective integrated circuit enclosed article as disclosed in International Application PCT/JP02/06070, which is characterized by comprising at least an integrated circuit enclosed integrated circuit module, optical retroreflective element and their carrier layer.

Where this article is used, the retroreflective layer encloses therein at least an electronic recognition device, which may be provided between any layers of surface-protective layer, information display layer, retroreflective layer and back-protective layer.

It is also permissible to provide two or more of electronic recognition units in which radio frequency identification integrated circuit or circuits having different carrier frequency characteristics or two or more antennas of different shapes, said electronic recognition units being connected by electric circuit or circuits to allow said units to be stored with common electronic information.

Combined use of two or more of radio frequency identification integrated circuits having different carrier frequency characteristics enables to utilize, for example, combination of distance coupling type and proximity coupling type reader/writers, by combining different communication distances or communication speeds.

Carrier frequencies decided or under deliberation for ISO rating SC 31-18000 are 135 kHz (18000-2), 13.56 kHz (18000-3), 2.45 GkHz (18000-4), 5.85 GHz (18000-5), 860-930 kHz (18000-6) and 433.92 kHz (18000-7). While it is possible to combine two or more of radio frequency identification integrated circuits having these carrier frequencies, useful frequencies are not limited to this frequency zone.

Moreover, by combining different communication means using different modulation systems, for example, amplitude modulation (AM), amplitude shift keying (ASK), ON/OFF keying (OOK), bi-phase shift keying (BPSK), phase shift keying (PSK) and frequency shift keying (FSK), improved communication accuracy or secrecy protection of transmitted information can be achieved.

Those electronic recognition units connected by electric circuit or circuits share the electronic information stored in said units in common, making high level mass information processing possible.

While shape and size of communication antennas useful in the present invention are not critical, as examples of the shape coiled or loop antennas can be used.

In particular, for vehicle number plates it is preferred that the entire plates are retroreflective. For example, UK Rating BS AU 145d: 1998 Specification for Retroreflecting Number Plates minutely sets rules concerning retroreflection rating, and in its FIG. 1 shows the minimum area which should retroreflect.

According to said FIG. 1 of the UK Rating; the outer periphery of 6 mm in width of the number plate is not required to retroreflect. Hence it is particularly preferred to install a loop antenna in this area, because such meets the UK Rating and enables installation of the maximum size antenna.

Furthermore, such a communication antenna to enable communication between the radio frequency identification integrated circuit or circuits and external units can be installed on the carrier layer (core layer or inner layer), using such materials as thin metallic wire, foil or vapor-deposited metal in the form of mesh, line or loop.

Both of said radio frequency identification integrated circuit or circuits and communication antenna or antennas are provided between those layers constituting the present invention or inside of said layers, and a power supply connector for supplying power from an external source or an electromagnetic coupling structure through a dielectric for conveying electronic signals are not necessary. Therefore, the antenna or antennas and the integrated radio frequency identification integrated circuit or circuits in the present invention are coupled either directly or through a jumper. As the coupling means, a conductive adhesive, anisotropic bonding sheet, soldering, brazing, or welding can be used.

To form the antenna to be used for the present invention, a partial installation method of partially installing a metallic thin film layer; a partial removal method of partially removing a metallic thin film layer, or a mechanical processing method can be used.

As such partial installation method, it is possible to use a method comprising setting a mask on the layer on which an antenna is to be installed, by such means as printing, masking, or lithography and then installing a metallic thin film layer of a desired shape of the antenna by such means as vacuum deposition, sputtering, electroplating or chemical plating.

In the occasion of installing an antenna on retroreflective sheeting by such a partial installation method, where the sheeting is micro glass bead type, it is possible to install the antenna and a metallic thin film layer simultaneously on an identical layer, through the steps of embedding micro glass beads, applying, where necessary, a mask on the micro glass beads-embedded side onto which a metallic thin film layer is to be provided via a resin thin film layer, and thereafter depositing aluminum by vacuum vapor deposition method. The antenna thus formed shows retroreflective performance. Also in the case of a prism type retroreflective sheeting, it is possible to similarly install an antenna and a metallic thin film layer on the same layer at the same time on the reflective surfaces of the prisms.

In the partial removal method, a metallic thin film layer is formed in advance on the layer on which the antenna is to be installed, by such means as vapor deposition, sputtering, electroplating or chemical plating, and thereafter said metallic thin film layer is partially removed in a pattern corresponding to the desired shape of the antenna by such means as chemical etching, dry etching, laser illumination or a mechanical removal method such as sandblasting.

In the occasion of installing an antenna on the retroreflective sheeting by said partial removal method, a preferred method comprises forming a metallic thin film layer such as of aluminum or the like on an entire surface of a micro glass bead type retroreflective sheeting or prismatic retroreflective sheeting by a means known per se such as vapor deposition; partially applying an etching solution in a pattern to retain the desired shape of the antenna by a printing method to form the antenna by means of chemical etching; and then neutralizing the etching solution and washing it off with water.

As the chemical agent to be used as such chemical etching solution, various types of acids and alkalis can be used. Examples of useful acids include aqueous solutions of hydrochloric acid, nitric acid, sulfuric acid and phosphoric acid, and examples of useful alkalis include aqueous solutions of sodium hydroxide and potassium hydroxide. Though the concentration of the chemical etching solution needs to be suitably selected in accordance with such factors as the kind of the acid or alkali used, thickness of the metallic thin film layer and the etching rate, generally it can be 5 to 40 wt %.

To perform such chemical etching by a printing method, it is preferable to add various kinds of macromolecular compounds such as polyethylene glycol, polypropylene glycol, sodium alginate, polyacrylic acid salts, polyvinyl alcohol, and various cellulose derivatives such as hydroxyethylcellulose, carboxylated methylcellulose, and methylcellulose as viscosity modifiers in order to improve printability. Whereas, the kind and concentration of usable viscosity modifiers can be suitably selected in accordance with individual printing method and printing rate and therefore, they are subject to no special limitation.

Moreover, it is preferable to add a surface active agent to the chemical etching solution in order to improve its wettability of, or permeability into, the metallic thin film layer. The type of useful surface active agent is not particularly restricted. Whereas, those preferred are cationic surfactants such as amine type, ammonium salt type and pyridine derivatives; anionic surfactants such as sulfated oil, fatty acid salts, sulfated ester oils and alkyl sulfates; and nonionic surfactants such as partial fatty acid esters of polyhydric alcohols and fatty acid-ethylene oxide adducts.

Though the printing method is not critical, gravure printing, screen printing or ink jet method are preferred. Moreover, as other removing method, it is possible to use dry etching, laser illumination or mechanical removing method such as sandblasting.

As mechanical processing means, a method of processing a metallic thin plate into an antenna shape by punching or laser processing, or processing a thin metallic wire into a loop-form, and mounting such antenna on the carrier layer can be readily practiced.

In any of above methods, the metal to be used as the material of the metallic thin film layer or antenna can be suitably selected from aluminum, aluminum-magnesium alloy, aluminum-manganese alloy, silver, copper, nickel, copper-nickel alloy, brass and phosphor bronze, which can be used either singly or as a composite or laminate. Particularly, aluminum and copper are preferable because they excel in radio frequency reception performance.

A preferred thickness of the metallic thin film layer forming the communication antenna is 0.2 to 500 μm. A metallic thin film layer thickness of less than 0.2 μm is undesirable because it is apt to give rise to such problems that the radio frequency reception performance is deteriorated or the specular reflection characteristic is deteriorated when the metallic thin film layer is used as the reflective layer of the retroreflective sheeting. Whereas, a metallic thin film layer thickness of more than 500 μm is undesirable because it is liable to invite such problems that the sheeting thickness becomes excessive, flexibility of the sheeting is deteriorated, bendability also is deteriorated, or it causes deterioration in resolution in the occasion of forming the antenna to make it difficult to obtain a sharp antenna pattern.

Moreover, aluminum is particularly preferable because it shows superior optical characteristics when it is used as the metallic thin film layer of the retroreflective sheeting. An apparatus suitable for continuous vapor deposition of aluminum thin film layer comprises a vacuum vessel which is capable of maintaining a degree of vacuum at around $7 \times 10^{-4}$ to $9 \times 10^{-4}$ mmHg, said vacuum vessel accommodating therein a feeder for feeding an original retroreflective sheeting formed of a base sheet and a surface-protective layer which is laminated on the light entrance side surface of said base sheet; a take-up winder for winding up the original retroreflective sheeting which has been vacuum-deposition treated; and a heating system installed between the feeder and the take-up winder, which is capable of fusing the aluminum in a graphite crucible with an electric heater. Pure aluminum pellets having a purity of at least 99.99 wt % are put in the graphite crucible and it is possible to vacuum deposit a metallic thin film layer on surfaces of the retroreflective units to a thickness of, e.g., 0.2 to 2 μm with melted and vaporized aluminum atoms under conditions of, e.g., at an AC voltage of 350 to 360 V, electric current of 115 to 120 A and a treatment rate of 30 to 70 m/min.

When a communication antenna is provided on the prismatic reflective surfaces in the above-described manner, not only the CC units area on which the antenna is not mounted, but also all other areas of the CC units on which the communication antenna is mounted can retroreflect incoming light toward the light source, resulting in excellent advance recognizability in the nighttime. While conventional communication antennas can be installed on flat regions only, the communication antennas which are installed on prismatic reflective surfaces of CC units or micro glass beads according to the present invention can secure increased antenna areas due to the uneven surface configuration and, therefore, excel in communication ability.

In the retroreflective layer on which a metallic thin film layer is provided, said layer on the cube-corner prisms or micro glass bead-type units can be divided into electrically insulated lots, not forming a continuous layer, for the purpose of preventing occurrence of radio frequency noises from radio waves coming from external units, due to the metallic thin film layer.

The width of the partitions forming the lots, which are not provided with the metallic thin film layer, may be so narrow as to be visually impossible of perception, so long as it is sufficient to secure electric insulation. It is preferred, however, that the width of such insulation areas is at least 1 μm. As a means for forming the partitions, etching method as exemplified in the foregoing can be used. The partition areas with such narrow width do not cause degradation in appearance, the device giving uniform retroreflection at night.

Furthermore, with micro glass bead units, it is preferred that the metallic thin film layer provided on the micro glass beads does not form a continuous layer among the micro glass beads, but allows the beads to be independent of each other as electrically insulated micro glass bead retroreflective units. As a method for obtaining such a micro glass bead retroreflective unit layer, one disclosed in JP Sho 62 (1987)-121043A (U.S. Pat. No. 4,897.136) to Bailey, et al. is suitable.

It is also preferred for preventing radio frequency noises, that at least the metallic thin film layer provided on the cube-corner prisms or micro glass bead units, which are laid on the area or areas in which the communication antenna or antennas are installed, should be removed.

The radio frequency identification integrated circuit module used for the present invention is composed of memory circuits such as CPU (Central Processing Unit), RAM (Random Access Memory), ROM (Read Only Memory), EEPROM (Electronically Erasable Programmable ROM) and the like, and is so designed as to be able to execute processing function, storage function and input/output control function.

It also has a built-in non-contact type radio frequency identification integrated circuit which is generally referred to as RF-ID (Radio Frequency-Identification IC).

The device furthermore is provided with, as means for exchanging information with external units via the communication antenna or antennas, a demodulator for distributing electromotive force induced by radio waves from an external unit, between receiving signal and electromotive force for the card, binary circuit and besides, modulator, RF amplifier, fitter matching circuit and the like for transmitting sending data.

The surface-protective layer useful for the present invention is not subject to particular limitation, so long as it is optically transparent, transmits radio waves, and is stable to UV rays and moisture from outside, but such materials as disclosed in U.S. Publication No. US2004/0218273A1 filed by the present inventor can be used.

Also for the back-protective layer, one excelling in durability and which can prevent infiltration of moisture, UV rays or the like from outside can be suitably used.

Those surface-protective layer, information display layer, retroreflective layer, back-protective layer and radio frequency identification unit or units provided between the foregoing layers, which constitute a retroreflective device equipped with radio frequency identification unit or units according to the present invention, are adhered, connected or integrated by various methods to form a display device of the present invention.

As such methods for adhering, connecting or integrating, those using various adhesives, adhesive sheet, tackifier, tack sheet or the like; heat sealing with heating and pressing; or mechanical fixing, can be applied either singly or in suitable combination. The binding can also be effected by such means as various heat-sensitive adhesives, pressure-sensitive adhesives; thermosetting, UV curing or electron beam curing type crosslinkable adhesivers, or thermofusion.

In particular, such various adhesives, adhesive sheet, tackifier or tack sheet are preferably optically transparent and excel in durability. It is also preferred to add UV absorber, light stabilizer and the like to improve durability.

Particularly, where the present device is to be adhered to a light-transmitting substrate, it is preferable to use a poly (meth)acrylate resin type pressure-sensitive adhesive from viewpoints of light transmittability and heat resistance. It is also preferable to add the same ultraviolet absorber, light stabilizer or antioxidant as those used for the top-protective layer, each at a rate of 0.05 to 5 wt %, for improving weatherability and heat resistance.

An information display layer which is used in the present invention is a layer provided with various literal information, logograms, designs, patterns, photopictures, bar codes and the like. As means for providing such, printing methods such as photogravure printing, screen printing, offset printing or ink jet printing; transferring from thermal transfer ink ribbon; arranging cut-out letters; and the like can be suitably adopted.

The information display layer may be optically transparent or opaque, or it may be a retroreflective layer.

As an illuminator useful for the present invention, either a back-projector type or side-projector type illuminating device can be used. As the light source useful in each type of illuminating devices, fluorescent lamp, cold-cathode tube, halogen lamp, Xenon lamp, sodium lamp or LED can be used. Such various light sources are preferably combined with back-reflective plate or light-guiding plate, to achieve uniform luminance. A back-reflective plate used in the present invention has a parabolic cross-sectional configuration focusing on the center of the light source, and is most preferably positioned to allow the light emitted by the light source to enter into the prismatic retroreflective units from their backs at an entrance angle of 0 to 30° to the normal line of the surface constituting the information display section.

Of those useful light sources, LED, in particular, white LED, is preferred as a low energy-consuming, lowly exothermic and yet high illuminance light source.

A combination of such a light source with a light-guiding plate is an excellent illumination device for making a thin internally illuminated sign. While any suitable light-guiding plate can be selected, for example, a white light-reflective sheet, milk-white, semi-transparent plate, prismatic sheet with linear grooves cut on the surface and prismatic sheet with a surface on which triangular-pyramidal or quadrangular-pyramidal prisms are formed can be used.

Adoption of above-described light-guiding plate or planar luminophor is preferred because it facilitates entrance of the light emitted by the illuminator used in the retroreflective internally illuminated sign of the present invention into the prismatic retroreflective units from the back, at an entrance angle of 0 to 30° to the normal line of the surface constituting the information display section, to effectively intensify the light transmitting from the back to the front of the sign. Where the entrance angle of the light exceeds 30°, effective transmission of the light becomes difficult and such is undesirable.

The above-described information display section and illuminator are integrated by a housing which encloses them. The shape of the housing is not critical, which can be suitably selected among rectangular parallelepipeds, columns and the like. The material making up said body again is not critical, various materials such as plastics, wood, stone and the like can be used either singly or in combination. While it is preferred for the housing to take an hermetically sealed construction to prevent infiltration of water and dust from outside, a construction allowing discharge of internally generated vapor, heat or externally infiltrated water to outside may also be adopted.

Furthermore, accessory devices such as a power source may be installed inside or outside of the housing. The sources include ordinary external alternating-current power supply, direct-current storage battery and solar battery. In particular, an illuminator formed of a combination of solar battery with low-energy EL light source is preferred from the standpoint of free maintenance, long life and low energy cost.

Because a planar luminophor using an electroluminescent material is used as the light source, the invention is suitable for forming thin internally illuminated signs. Moreover, a planar light-emission type illuminator based on EL principle gives an internally illuminated sign showing very uniform luminance distribution and, therefore, is particularly preferred.

Adoption of said planar luminophor based on EL principle facilitates entrance of the light emitted by the illuminator used in the retroreflective internally illuminated sign of the present invention into the prismatic retroreflective units from the back, at an entrance angle of 0 to 30° to the normal line of the surface constituting the information display section, to effectively intensify the light transmitting from the back to the front of the sign. Where the entrance angle of the light exceeds 30°, effective transmission of the light becomes difficult and such is undesirable.

Also for the back-protective layer, one excelling in durability, which can protect the device of the present invention from infiltration of moisture or UV rays from outside can be suitably adopted.

The retroreflective display device of the present invention, which is constructed as above-described adopts a retroreflective layer carrying a large number of retroreflective units in a retroreflective display device equipped with radio frequency identification integrated circuit or circuits, as a means to enable viewers to recognize the presence of products according to the present invention before mutual communication of the device with reader/writers become possible, without using any special recognition means and even at night, said reflective layer being capable of reflecting light from an external source toward the light source. Also by providing an illuminator at the back of said retroreflective display device, the device can be recognized from a wide scope of observation sites.

The retroreflective display device of the present invention excels in improving advance visual recognizability as aforesaid, and as another form of using the article of the present invention, for example, traffic signs or vehicle number plates can be named. The retroreflective layer used in the article of the present invention, for example, visually gives recognizable information to a vehicle driver in advance and concurrently retroreflects a light generated from a light source of a reflection type sensor toward a photo receiver located nearby the light source, to indicate approach of the display device.

Where a metallic thin film layer is provided on cube-corner prismatic or micro glass bead units in the retroreflective layer, because the film does not form a continuous layer but is divided into electrically insulated lots, occurrence of noise caused by radio waves coming from external sources can be prevented.

Also in the retroreflective display device equipped with two or more radio frequency identification units having built-in radio frequency identification integrated circuit or circuits and communication antenna or antennas, said electronic identification units are connected with electric circuit or circuits to allow the units to store common electronic information, to make high level, mass information processing possible.

In particular, the retroreflective display device equipped with two or more radio frequency identification units having built-in radio frequency identification integrated circuit or circuits and communication antenna or antennas, can concurrently conduct proximity coupling type and distance coupling type identification because the radio frequency identification units have different transmitting frequencies and hence can conduct high level information processing and information management.

The illuminator in combination with electroluminescent light source used in the present invention makes it possible to provide thin and light-weight EL internally illuminated retroreflective display device.

BEST MODE FOR CARRYING OUT THE INVENTION

First, referring to FIGS. 1-10, best embodiments of the retroreflective display device of the present invention, each of which is provided with radio frequency identification unit or units are explained.

Figure 1:
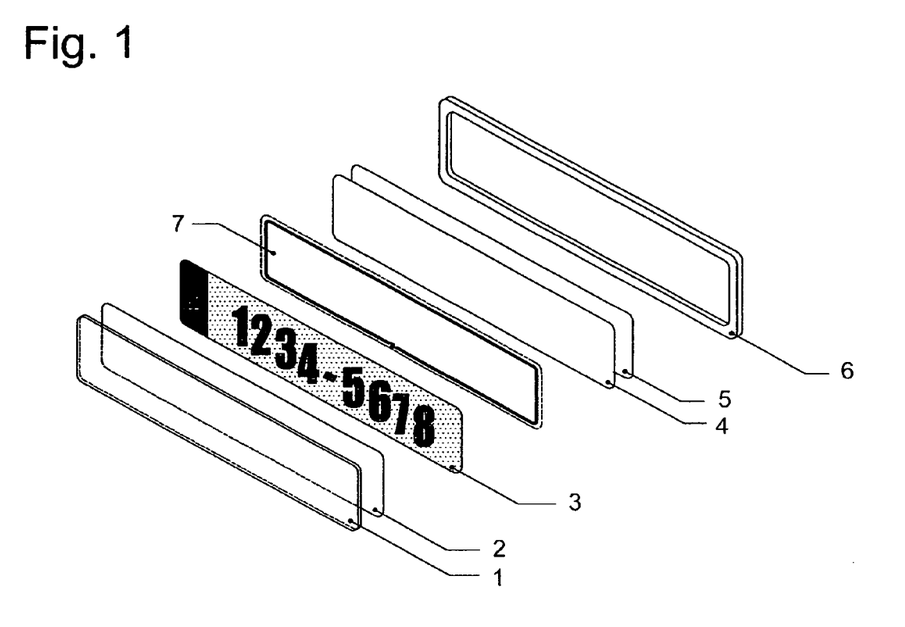
FIG. 1 is an exploded view showing the construction of a best embodiment of the retroreflective display device of the present invention, which is provided with radio frequency identification unit or units.

FIG. 1 shows a preferred embodiment of a radio frequency identification type retroreflective vehicle number plate, as an example of the retroreflective display device according to the present invention, which is provided with one or more radio frequency identification units and one or more communication antennas.

The surface-protective layer 1 is made of 5 mm-thick polymethacrylate sheeting, and on the surface of the retroreflective layer 3 an information display layer showing a vehicle number or various logograms is printed. The radio frequency identification unit 7 is made of a 50 μm-thick polyethylene terephthalate sheet, on which a looped communication antenna with an antenna pattern width of 1 mm and a radio frequency identification integrated circuit having a carrier frequency of 13.56 MHz are installed as electrically connected with a conductive adhesive. The back-protective layer 5 and the foregoing layers are integrated with acrylic adhesives 2 and 4. It is further protected with a polyvinyl chloride cover 6 which prevents infiltration of water or dirt from outside.

As the retroreflective layer, enclosed type retroreflective sheeting, NIKKALITE™ MLG grade manufactured by Nippon Carbide Industries Co., Inc. is used. From its outer edge of 6 mm in width whereon said loop antenna is installed, the metallic thin film layer provided on micro glass beads has been removed by etching using an aqueous sodium hydroxide solution.

Figure 2:
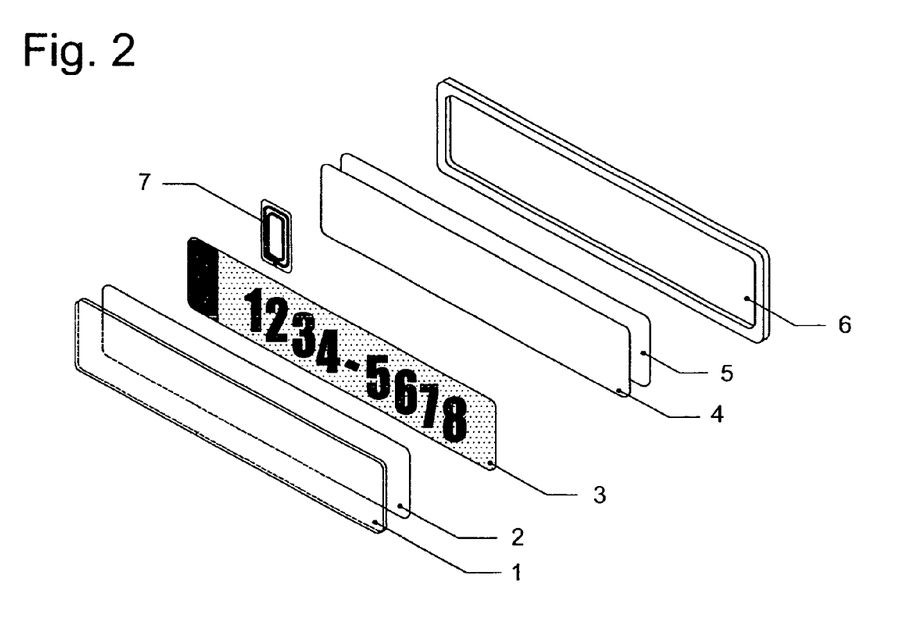
FIG. 2 is an exploded view showing the construction of a best embodiment of the retroreflective display device of the present invention, which is provided with radio frequency identification unit or units.

FIG. 2 shows another preferred embodiment of a radio frequency identification retroreflective vehicle number plate, as another example of the retroreflective display device of the present invention, which has radio frequency identification unit or units.

In the embodiment illuminated in FIG. 2, a radio frequency identification unit 7 is made of a 50 μm-thick polyethylene terephthalate sheet, on which a coiled communication antenna with an antenna pattern width of 1 mm and a radio frequency identification integrated circuit having a carrier frequency of 13.56 MHz are installed as electrically joined with a conductive adhesive.

For the retroreflective layer 3 which is provided with an information display layer, an internal total reflection type prismatic retroreflective sheeting, NIKKALITE CRYSTAL™ grade #92801 manufactured by Nippon Carbide Industries Co., Inc. is used. In this retroreflective layer no metallic thin film layer is provided on the retroreflective units, and hence the layer is conveniently free of radio frequency noises caused by such a metallic thin film layer.

Figure 3:
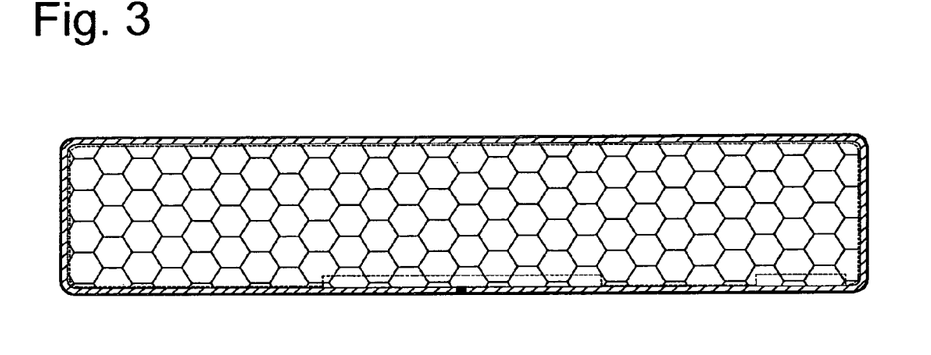
FIG. 3 shows appearance of an antenna means to be used with a best embodiment of the retroreflective display device of the present invention, which is provided with radio frequency identification unit or units.
Figure 4:
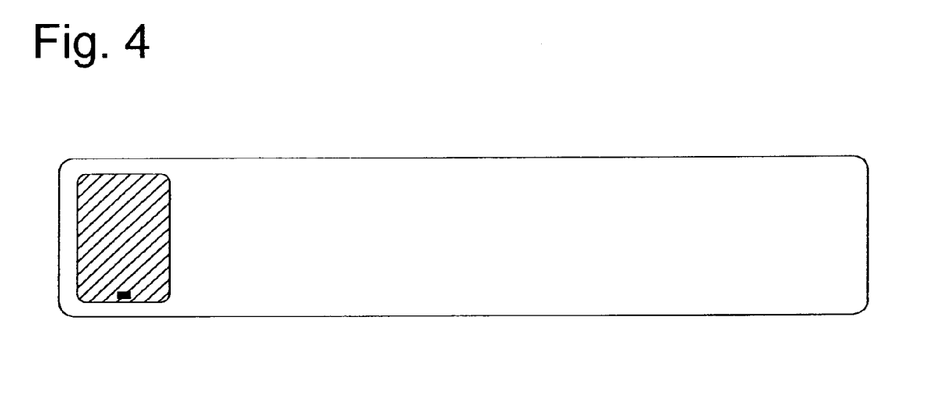
FIG. 4 shows appearance of an antenna means to be used with a best embodiment of the retroreflective display device of the present invention, which is provided with radio frequency identification unit or units.
Figure 5:
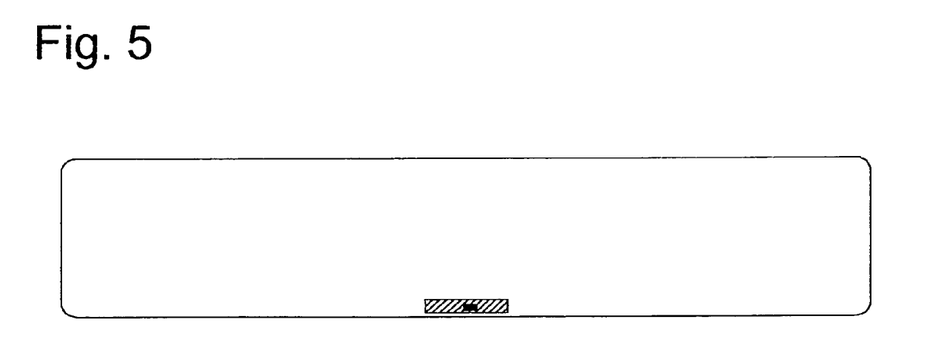
FIG. 5 shows appearance of an antenna means to be used with a best embodiment of the retroreflective display device of the present invention, which is provided with radio frequency identification unit or units.

FIGS. 3-5 show preferred embodiments of communication antennas which can be used for retroreflective display devices according to the present invention, which have radio frequency identification units. The areas filled with diagonal lines in these figures indicate antennas, and the areas painted out black, radio frequency identification integrated circuits, which are electrically connected with conductive adhesive or the like via jumpers or the like.

FIG. 3 shows a looped antenna useful for the present invention. FIG. 3 also shows the minimum region which must retroreflect, as specified by FIG. 1 of the retroreflection rating in UK Ratings BS AU 145d:1998 Specification for Retroreflecting Number Plates. The regions which are not required to retroreflect are the antenna area as indicated in FIG. 3 (of the width within 6 mm) and the two regions enclosed with dotted lines. The metallic thin film layer laid on those retroreflective units within these non-reflective regions can be removed to prevent occurrence of radio frequency noises.

Moreover, it is preferable also for the most of the reflective region as specified above, to divide the metallic thin film layer thereover with imperceptibly narrow areas of about 1 μm in width, into electrically insulated, separate areas, to prevent radio frequency noises. While the size or shape of said separating areas are subject to no critical limitation, they may be such that can divide the retroreflective region into 0.5—10 cm square regions. In FIG. 3 the areas are shown as hexagonal meshes, but the separating areas are narrow enough not to allow their easy recognition from its appearance.

FIG. 4 shows a coiled antenna useful for the present invention. With an antenna of this shape, it is preferable either to remove the metallic thin film layer at the location corresponding to that of the antenna in advance, or to divide it into electrically insulated, separate regions as above.

An internal total reflection type prismatic retroreflective layer may also be used. This retroreflective layer is preferred because no metallic thin film layer is provided on the retroreflective units therein and hence it is free of noises caused by radio frequency.

FIG. 5 shows an ultra-small size loop antenna useful for the present invention. Because the area from which the metallic thin film layer is to be removed can be minimized with such a small antenna, this embodiment also is preferred.

Figure 6:
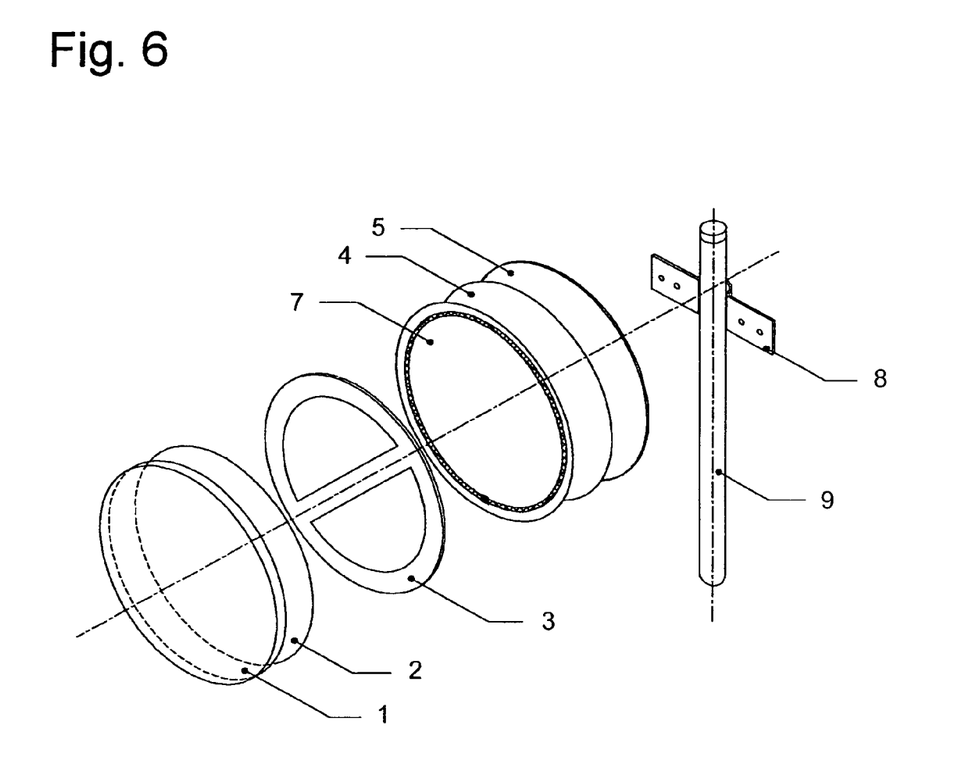
FIG. 6 is an exploded view showing the construction of a best embodiment of the retroreflective display device of the present invention, which is provided with radio frequency identification unit or units.

FIG. 6 shows a preferred embodiment of a radio frequency identification type traffic sign, as an example of the retroreflective display device of the preset invention, which has radio frequency identification unit or units.

A 7.5 mm-thick polymethyl acrylate-made surface-protective layer 1 of 90 cm in diameter, and internal total reflection type prismatic retroreflective layer 3 with traffic regulation information printed on the surface thereof as an information display layer, a radio frequency identification unit 7 in which a circular communication loop antenna and radio frequency identification integrated circuit are provided on a 75 μm-thick polyethylene terephthalate sheet, and a back-protective layer 5 are integrated by adhesive layers 2 and 4.

As the material useful for said back-protective layer, plastics, wood, iron plate or aluminum plate customarily used for traffic signs may be named. Of these, plastics and wood are preferred.

The traffic sign is mounted on a stationary support 9, with a metal fitting 8.

FIGS. 7-10 show, with cross-sectional views, preferred constructions of the retroreflective display devices according to the present invention, which are provided with radio frequency identification units.

Figure 7:
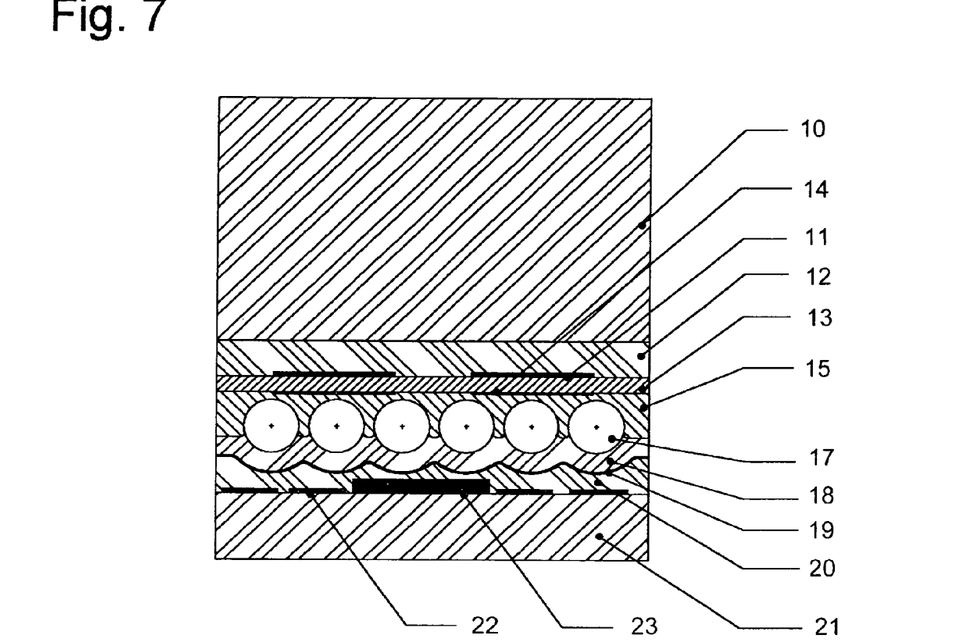
FIG. 7 is a cross-sectional view of a best embodiment of the retroreflective display device of the present invention, which is provided with radio frequency identification unit or units.

FIG. 7 shows an embodiment wherein an enclosed lens type retroreflective sheeting is used as the retroreflective layer. In FIG. 7, 10 is a surface-protective layer, 12 is an adhesive layer, and 11 is an information display layer provided as printed on the retroreflective layer. The retroreflective layer is composed of a surface layer 13, printed layer 14 which can also serve as an information display layer, holding layer 15 for retroreflective units, micro glass beads 17, focus-adjusting layer 18, and a metallic, thin film layer 19 for reflecting light. The radio frequency identification unit is composed of communication antennas 22 and a radio frequency identification integrated circuit 23, and is adhered between the back-protective layer 21 and the retroreflective layer, with an adhesive layer 20.

Figure 8:
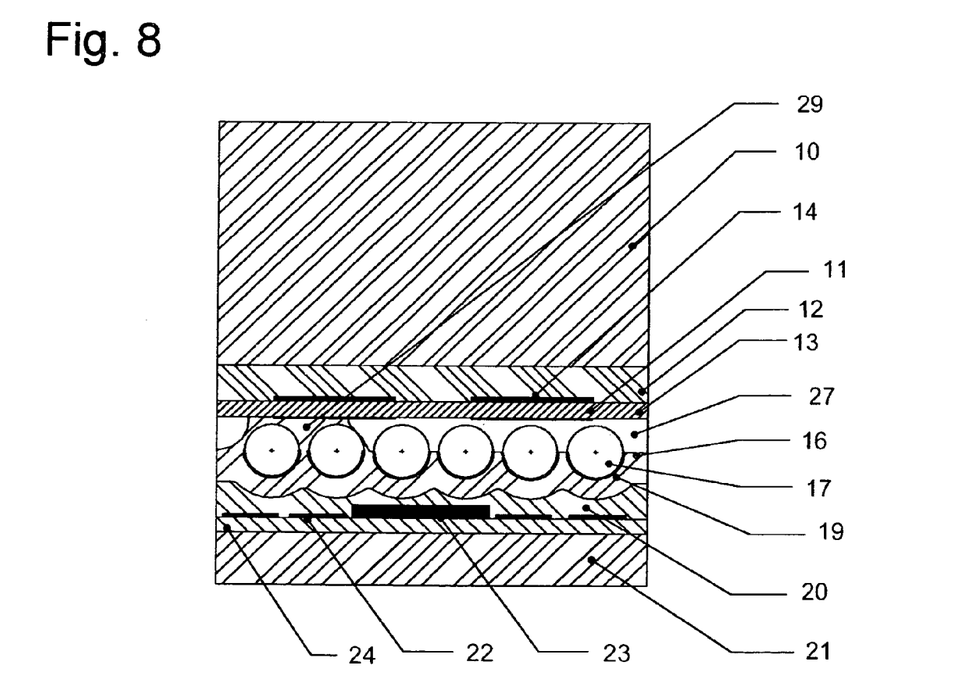
FIG. 8 is a cross-sectional view of a best embodiment of the retroreflective display device of the present invention, which is provided with radio frequency identification unit or units.

FIG. 8 shows an embodiment wherein an encapsulated lens type retroreflective sheeting is used as a retroreflective layer. In FIG. 8, 10 is a surface-protective layer, 12 is an adhesive layer, and 14 is an information display layer which is provided as printed on the retroreflective layer. The retroreflective layer is composed of a surface layer 13, a binder layer 16 for retroreflective units, micro glass beads 17 and a metallic, thin film layer 19 for reflecting light. Said surface layer 13 and the binder layer 16 form a hermetically sealed structure due to the presence of bonds 29, whereby providing an air layer 27. The radio frequency identification unit is composed of a carrying layer 24, communication antennas 22 installed thereon and a radio frequency identification integrated circuit 23, and is adhered between the back-protective layer 21 and the retroreflective layer, with an adhesive layer 20.

Figure 9:
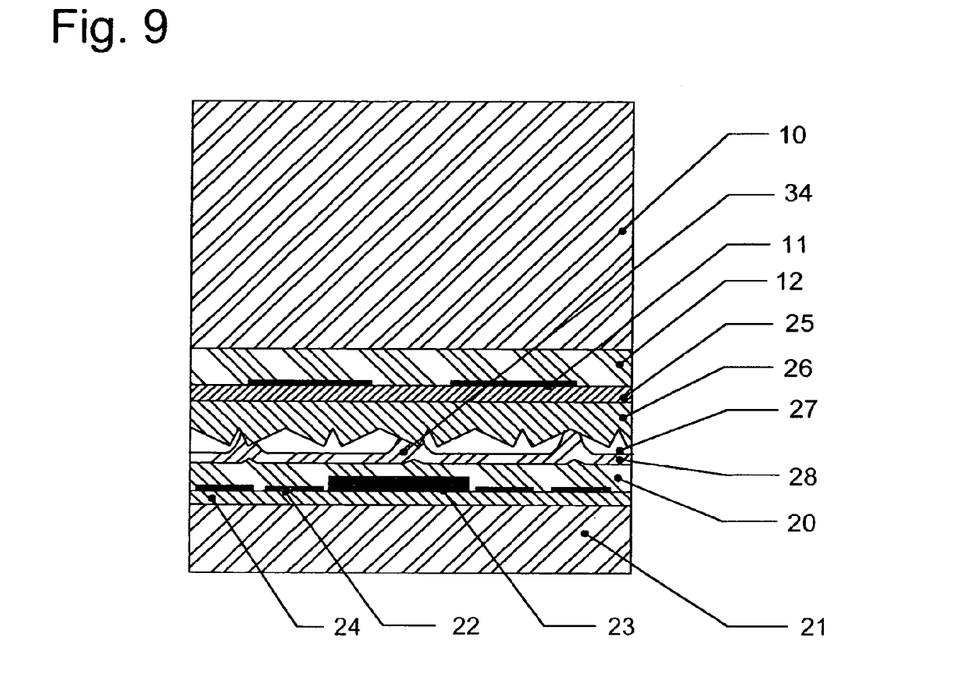
FIG. 9 is a cross-sectional view of a best embodiment of the retroreflective display device of the present invention, which is provided with radio frequency identification unit or units.

FIG. 9 shows an embodiment wherein an internal total reflection type prismatic retroreflective sheeting is used as the retroreflective layer. In FIG. 9, 10 is a surface-protective layer, 12 is an adhesive layer, and 11 is an information display layer which is provided on the retroreflective layer by printing. The retroreflective layer is composed of a surface layer 25, a binder layer 28 for retroreflective units, and a micro prismatic layer 26. Said micro prismatic layer 26 and the binder layer 28 form a hermetically sealed structure to provide an air layer 27. The radio frequency identification unit is composed of communication antennas 22 and a radio frequency identification integrated circuit 23, and is adhered between the back-protective layer 21 and the retroreflective layer, with an adhesive layer 20.

Figure 10:
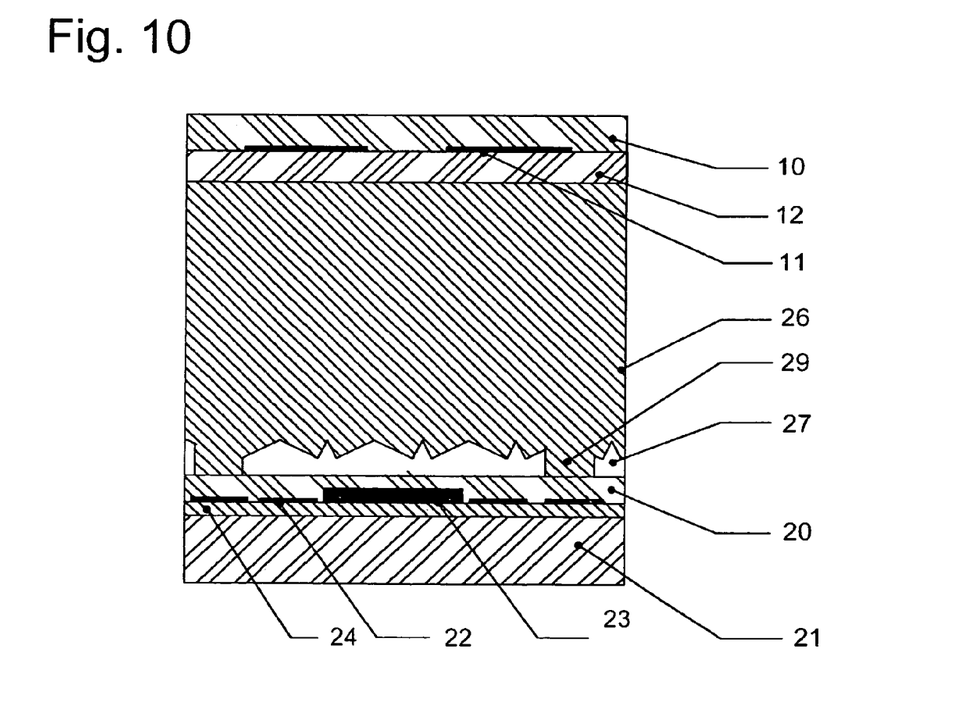
FIG. 10 is a cross-sectional view of a best embodiment of the retroreflective display device of the present invention, which is provided with radio frequency identification unit or units.

FIG. 10 shows another embodiment wherein an internal total reflection-type prismatic retroreflective sheeting is used as the retroreflective layer. The surface-protective layer 10 is provided as a thinner, more flexible layer than that in the embodiment of FIG. 9, and on its back an information display layer 11 is provided by printing and is bound to the retroreflective layer with an adhesive layer 12.

The microprisms in FIG. 10 are moulded, for example, by compression moulding or injection moulding method, as an unflexible, thick layer, which also is provided with bonding portions 29 for forming an air layer 27 for effecting internal total reflection, and is whereby bound to radio frequency identification units 22 and 23 mounted on the carrying layer 24 and to the back-protective layer 21 via adhesive layer 20 to form a hermetically sealed structure.

Figure 11:
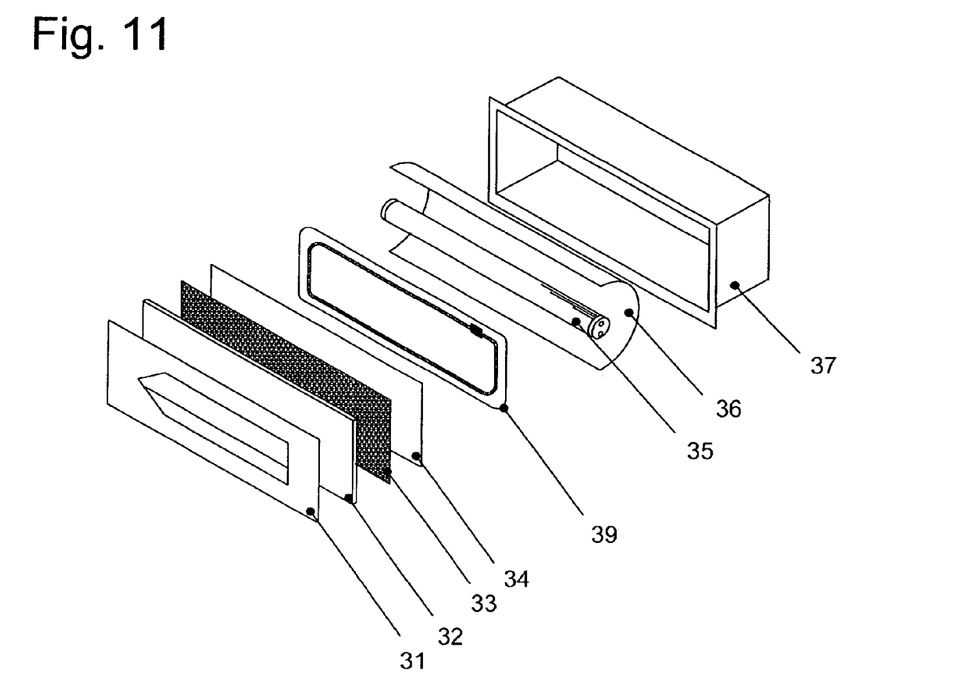
FIG. 11 is an exploded view showing the construction of a best embodiment of the internally illuminated retroreflective display device of the present invention, which is provided with radio frequency identification unit or units.
Figure 12:
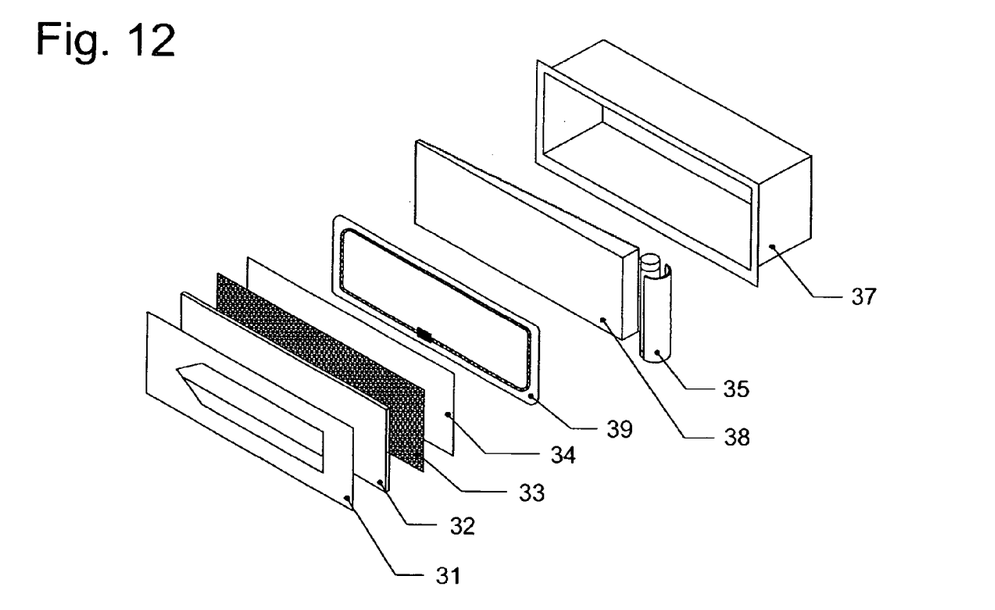
FIG. 12 is an exploded view showing the construction of a best embodiment of the internally illuminated retroreflective display device of the present invention, which is provided with radio frequency identification unit or units.

Next, FIGS. 11 and 12 are referred to, for explaining the best embodiments of the internally illuminated retroreflective display device according to the present invention, which encloses radio frequency identification unit or units.

FIG. 11 shows a preferred embodiment of the retroreflective traffic sign provided with a back projector type illuminator, as an example of the internally illuminated retroreflective display device according to the present invention, which encloses radio frequency identification unit or units.

In FIG. 11, 32 is a surface-protective layer with a back-reflection plate 31 provided on its surface, 33 is a retroreflective layer, 34 is a light-diffusion layer for uniformly dispersing the light from the inside, 39 is a radio frequency identification unit equipped with radio frequency identification integrated circuit or circuits and communication antenna or antennas, 35 is a light source means constituting an illuminator, 36 is a back-reflection plate for reflecting the light emitted from the light source means toward the front face, and 37 is a housing to enclose and support the internally illuminated retroreflective device.

FIG. 12 shows a preferred embodiment of the retroreflective traffic sign provided with a side-projector type illuminator, as another example of the internally illuminated retroreflective display device according to the present invention, which encloses radio frequency identification unit or units.

In FIG. 12, 32 is a surface-protective layer with an information display layer 31 provided on its surface, 33 is a retroreflective layer, 34 is a light-diffusion layer for uniformly dispersing the light emitted from the inside, 39 is a radio frequency identification unit equipped with radio frequency identification integrated circuit or circuits and communication antenna or antennas, 35 is a light source means constituting an illuminator, 38 is a light-guiding plate for reflecting the light emitted from the light source means toward the front face, and 37 is a housing to close in and support the internally illuminated retroreflective device.

Figure 13:
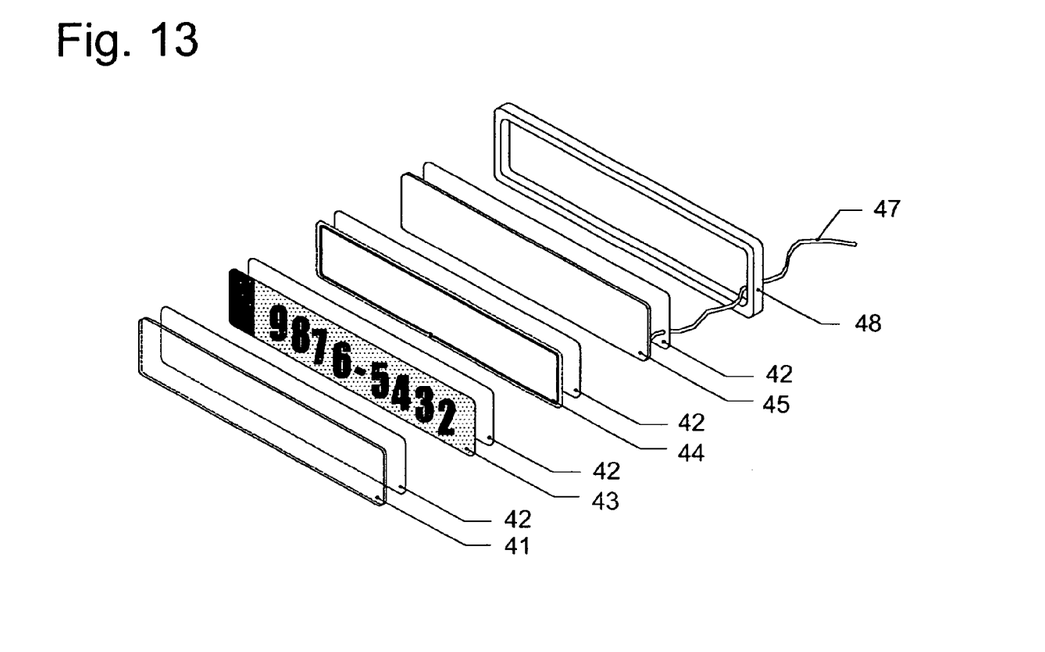
FIG. 13 is an exploded view showing the construction of a best embodiment of an EL internally illuminated retroreflective display device of the present invention, which has radio frequency identification unit or units.
Figure 14:
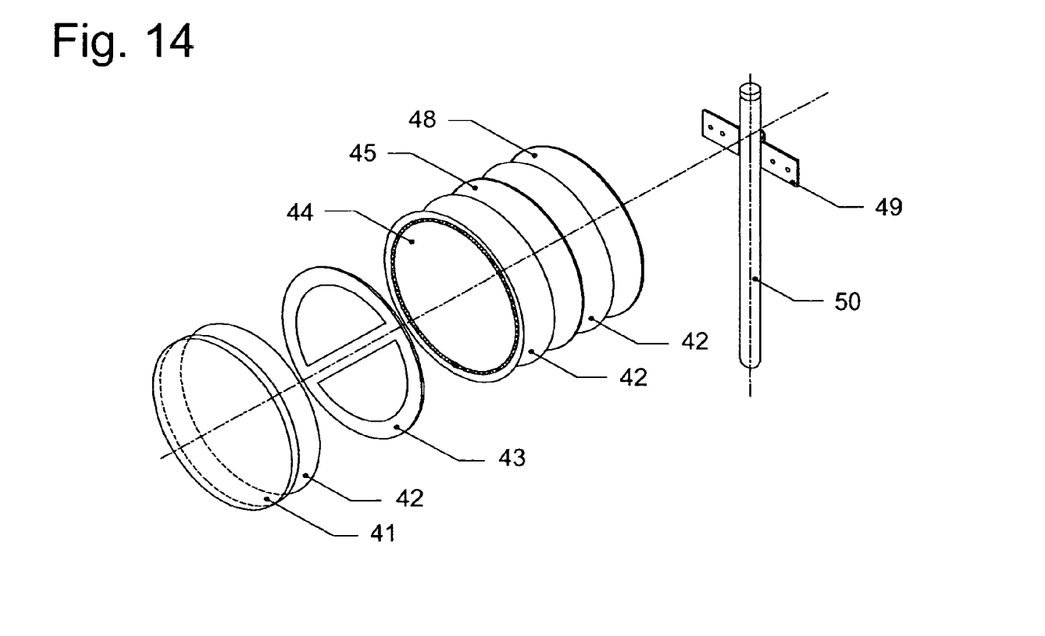
FIG. 14 is an exploded view showing the construction of a best embodiment of an EL internally illuminated retroreflective display device of the present invention, which has radio frequency identification unit or units.

Now the best embodiments of EL internally illuminated retroreflective display device having radio frequency identification unit or units of the present invention are explained, referring to FIGS. 13 and 14.

FIG. 13 shows a preferred embodiment of a radio frequency identification type, internally illuminated retroreflective number plate, as an example of the EL internally illuminated retroreflective display device of the present invention, which encloses radio frequency identification unit or units.

In FIG. 13, 41 is a surface-protective layer, 43 is a retroreflective layer with an information display layer provided on its surface, 44 is a layer in which radio frequency identification unit or units are installed, 45 is a light source means emitting electroluminescence, which is connected to an external source with electric wire 47 and 46 is a rectangular back-protective layer enclosing and supporting the foregoing layers. These layers are laminated with adhesive layers 42.

FIG. 14 shows a preferred embodiment of a radio frequency identification type, internally illuminated retroreflective traffic sign, as another example of the EL internally illuminated retroreflective display device of the present invention, which encloses radio frequency identification unit or units.

In FIG. 14, 41 is a surface-protective layer, 43 is a retroreflective layer with an information display layer provided on its surface, 44 is a layer in which radio frequency identification unit or units are installed, 45 is a light source means emitting electroluminescence, which is connected to an external source with typical electric wire (unillustrated) and 48 is a back-protective layer.

This traffic sign is set up at the edge of a road as a road side traffic sign, with a metal fitting 49 and support 50. The shape of the sign is not limited to such a road side type, but can be optionally selected such as rectangular road side signs or overhead signs.

The invention claimed is:

1. A retroreflective display device equipped with at least one radio frequency identification unit, which comprises:
   a surface-protective layer, an information display layer, a retroreflective layer and a back-protective layer,
   wherein at least one radio frequency identification unit is provided on or between these layers, each radio frequency identification unit comprising a radio frequency identification circuit having at least one communication antenna connected thereto either directly or through a jumper, and
   wherein said retroreflective display device is not connected to any external communication device.

2. A retroreflective display device equipped with radio frequency identification unit or units as described in claim 1, in which said communication antenna or antennas are provided on the back of the reflective surface of a retroreflective element.

3. A retroreflective display device as described in claim 1, in which said communication antenna or antennas are provided on the reflective surface of a retroreflective element.

4. A retroreflective display device as described in any one of claims 1-3, in which said retroreflective element is constructed of a large number of cube-corner prismatic retroreflective units.

5. A retroreflective display device as described in claim 4, in which said cube-corner prismatic retroreflective element units are constructed of internal total reflection type cube-corner prisms.

6. A retroreflective display device as described in claim 4, in which said cube-corner prismatic retroreflective element is constructed of specular reflection type cube-corner prisms which are formed of cube-corner prisms and a metallic thin film layer provided thereon.

7. A retroreflective display device as described in any one of claims 1-3, in which said retroreflective element is constructed of a large number of micro glass bead-type retroreflective units.

8. A retroreflective display device as described in claim 7, in which said micro glass bead-type retroreflective element is formed of the micro glass bead-type units and a metallic thin film layer provided thereon.

9. A retroreflective display device as described in claim 7, in which said micro glass bead-type retroreflective element is formed of the micro glass bead-type units and a metallic thin film layer provided thereon via a thin resin film layer.

10. A retroreflective display device as described in claim 8, in which said metallic thin film layer provided on said cube-corner prisms or micro glass bead units does not form a continuous layer but is divided into electrically insulated lots.

11. A retroreflective display device as described in claim 10, in which said metallic thin film layer provided on the micro glass bead units does not form a continuous layer between said micro glass bead units but is divided to form electrically insulated micro glass bead units independently of each other.

12. A retroreflective display device as described in claim 10, in which the metallic thin film layer does not form a continuous layer on at least those cube-corner prisms or micro glass bead units located in the region or regions on which communication antenna or antennas are installed, but is divided into electrically insulated lots.

13. A retroreflective display device as described in claim 12, in which the metallic thin film layer, which is provided on at least the cube-corner prisms or micro glass bead units which are located in the region or regions on which said communication antenna or antennas are installed, is removed.

14. A retroreflective display device as described in claim 12, in which at least two radio frequency identification units each enclosing radio frequency identification integrated circuit or circuits with communication antenna or antennas installed thereon are provided, said radio frequency identification units being connected with electric circuits so that common electronic informations are stored in said electronic identification units.

15. A retroreflective display device as described in claim 14, in which two or more radio frequency identification units each enclosing radio frequency identification integrated circuit or circuits with communication antennas installed thereon are provided, said radio frequency identification units having different propagation frequencies from each other.

16. The retroreflective display device according to claim 1, further comprising an internally illuminated sign structure wherein an illuminator is disposed at the back of said retroreflective layer, said retroreflective layer being retroreflective to the light coming from the front of the sign and transmissive to the light from the interior of said sign, said structure comprising said surface-protective layer, information display layer, retroreflective layer, back-protective layer, a radio frequency identification unit or units, an illuminator, and a housing to enclose and support the foregoing.

17. An internally illuminated retroreflective display device as described in claim 16, in which said communication antenna or antennas are formed at the back of the reflective surface of a retroreflective element.

18. An internally illuminated retroreflective display device as described in claim 16, in which said communication antenna or antennas are formed on the reflective surface of the retroreflective element.

19. An internally illuminated retroreflective display device as described in any one of claims 16-18, in which the retroreflective element constituting said retroreflective layer is composed of cube-corner prismatic retroreflective units.

20. An internally illuminated retroreflective display device as described in claim 19, in which said cube-corner prismatic retroreflective units are composed of internal total reflection type cube-corner prisms.

21. An internally illuminated retroreflective device as described in claim 19, in which said cube-corner prismatic retroreflective units are composed of specular reflection type cube-corner prisms formed of said cube-corner prisms and a metallic thin film layer partially laid thereon with an areal ratio of less than 80%.

22. An internally illuminated retroreflective display device as described in claim 21, in which said cube-corner prismatic retroreflective units are at least of one type of cube-corner prismatic retroreflective units selected from the group consisting of triangular pyramidal cube-corner units, full cube-type cube-corner units, tent-type cube-corner units and cross-prismatic units.

23. An internally illuminated retroreflective display device as described in any one of claims 16-18, in which the retroreflective element constituting the retroreflective layer is composed of micro glass bead-type retroreflective units.

24. An internally illuminated retroreflective display device as described in claim 23, in which said micro glass bead-type retroreflective units are composed of the micro glass bead-type units and a metallic thin film layer partially laid thereon at an areal ratio of less than 80%.

25. An internally illuminated retroreflective display device as described in claim 24, in which said metallic thin film layer partially laid on the cube-corner prisms or micro glass bead-type units at an areal ratio of less than 80% does not form a continuous layer but is divided into electrically insulated lots.

26. An internally illuminated retroreflective display device as described in claim 24, in which said illuminator used in the retroreflective, internally illuminated sign is either back-projector type or side-projector type illuminator.

27. The retroreflective display device according to claim 1, further comprising an electroluminescent illuminator disposed at the back of the retroreflective layer, said retroreflective layer being retroreflective to the light coming from the front of the sign and transmissive to the light from the interior of the sign.

28. An electroluminescence internally illuminated retroreflective display device as described in claim 27, in which said communication antenna or antennas are formed on the back of the reflective surface of the retroreflective element.

29. An electroluminescence internally illuminated retroreflective display device as described in claim 27, in which said communication antenna or antennas are formed on the retroreflective surface of the retroreflective element.

30. An electroluminescence internally illuminated retroreflective display device as described in any one of claims 27-29, in which the retroreflective element constituting the retroreflective layer is composed of cube-corner prismatic retroreflective units.

31. An electroluminescence internally illuminated retroreflective display device as described in claim 30, in which said cube-corner prismatic retroreflective units are composed of internal total reflection type cube-corner prisms.

32. An electroluminescence internally illuminated retroreflective display device as described in claim 30, in which said cube-corner prismatic retroreflective units are composed of specular reflection type cube-corner prisms formed of said cube-corner prisms and a metallic thin film layer partially laid thereon with an areal ratio of less than 80%.

33. An electroluminescence internally illuminated retroreflective display device as described in claim 32, in which said cube-corner prismatic retroreflective units are at least of one type of cube-corner prismatic retroreflective units selected from the group consisting of triangular pyramidal cube-corner units, full cube-type cube-corner units, tent-type cube-corner units and cross-prismatic units.

34. An electroluminescence internally illuminated retroreflective display device as described in any one of claims 27-29, in which the retroreflective element constituting the retroreflective layer is composed of micro glass bead-type retroreflective units.

35. An electroluminescence internally illuminated retroreflective display device as described in claim 34, in which said micro glass bead-type retroreflective units are composed of the micro glass bead-type units and a metallic thin film layer partially laid thereon at an areal ratio of less than 80%.

36. An electroluminescence internally illuminated retroreflective display device as described in claim 35, in which said metallic thin film layer partially laid on the cube-corner prisms or micro glass bead-type units at an areal ratio of less than 80% does not form a continuous layer but is divided into electrically insulated lots.

* * * * *